United States Patent Office.

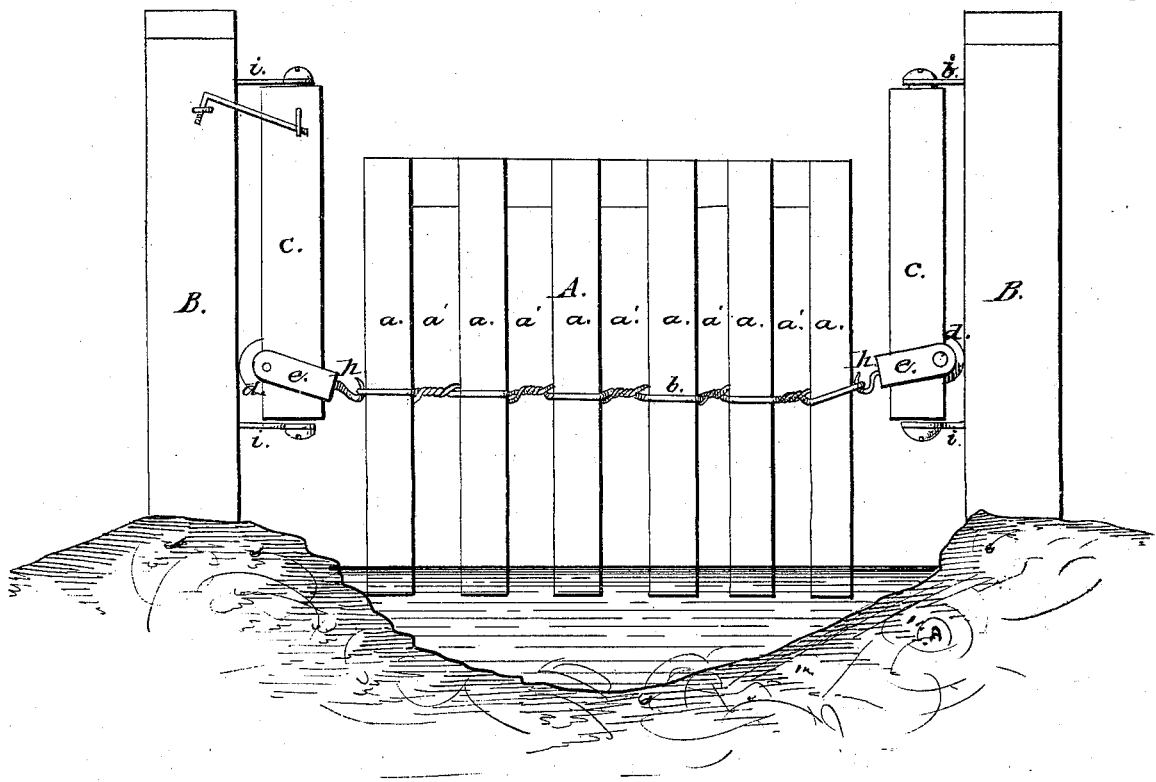

ANDREW MAIN, OF DELAWARE, OHIO.

Letters Patent No. 88,398, dated March 30, 1869.

IMPROVED FLOOD-GATE.

The Schedule referred to in these Letters Patent and making part of the same.

*To all whom it may concern:*

Be it known that I, ANDREW MAIN, of Delaware, in the State of Ohio, have invented a new and useful Improvement in Flood-Gates; and I do hereby declare that the following is a full, clear, and exact description of the same, reference being had to the accompanying drawings, and letters of reference marked thereon, making a part of this specification, in which—

Figure 1 is a side elevation.

To enable those skilled in the art to make and use my invention, I now proceed to describe its construction and operation.

Similar letters in the drawings refer to like parts.

This invention relates to a gate intended to be partially submerged in a stream, and to subserve the double purpose of allowing water to pass through and keeping back floating debris; and It consists in providing such a gate with friction-rollers, moving in vertical guides, so that it may adapt itself to different stages of water, and in attaching the gate to the said rollers by means of swivelling hooks, so as that it may turn and rest upon its side on the surface of the water, in the event of too powerful a current for it to stem, when standing upright, and in making the said vertical guides swivelling, so as that the gate may yield, to a certain extent, when subject to any sudden or unusual stress from the current.

In the drawings—

A represents an ordinary flood-gate, made with slats, $a$, to keep back debris, and interstices, $a'$, to let water through.

The slats are connected at the top, by a cross-bar, and when the stream in which the gate is suspended is too wide to admit of connecting them, lower down, in a similar manner, wire may be used, as seen in fig. 1, at $b$.

On either bank of the stream is planted a strong post, B, to each of which is attached, upon its inner side, a guide-bar, $c$, each guide-bar having a vertical groove in the side toward the post B, in which grooves run friction-rollers, $d\ d$, the latter being mounted in bent plates, $e\ e$, which embrace loosely the vertical guide-bar.

In the end of each bent plate, next the gate, is a swivelling hook, $h$, to which hooks the gate is hung.

At its top, the gate is connected, by hoops, to the guide-bars $c$, and thus maintained in an upright position; but when a freshet comes, and the current is so strong as to cause apprehension of the inability of the gate to resist it, when in this position, if the top fastenings be thrown off, the gate will at once swing over, and float upon its side upon the surface of the water.

The function of the friction-rollers and grooves is, it is evident, to enable the gate to rise or fall with the stream.

The guide-bars $c$ are provided with journals in their ends, which journals are placed in loose bearings in the ends of the horizontal supporting-rods, $i\ i\ i\ i$, and the bars are thus made swivelling, and permit the gate to give way a little, when any pressure is suddenly brought to bear upon it by the current, and thus reduce danger of fracture.

Having thus described my invention,

What I claim as new, and desire to secure by Letters Patent, is—

The gate A, in combination with the swivelling hooks $h$, bent plates and friction-rollers $d$, and swivelling guide-bars $c$, as and for the purpose described.

ANDREW MAIN.

Witnesses:
C. H. McELROY,
PERRY MOSES.